UNITED STATES PATENT OFFICE.

RUDOLPHUS S. DASHIELL, OF GREENSBOROUGH, NORTH CAROLINA.

IMPROVEMENT IN COMPOUNDS FOR PRESERVING FOOD.

Specification forming part of Letters Patent No. 208,159, dated September 17, 1878; application filed December 15, 1877.

*To all whom it may concern:*

Be it known that I, RUDOLPHUS S. DASHIELL, of Greensborough, Guilford county, North Carolina, have invented an Improved Preserving Process and Compound, of which the following is a specification:

The object of my invention is a composition intended for use in that class of preserving processes for fruits, &c., in which the preserving material is applied in the form of a vapor.

Heretofore sulphur alone, or sulphur and sugar or alum, have been used, and applied by vaporization to the article placed upon trays in a closed room or vessel. While the sulphur or sulphur and sugar serve to preserve the article and act as disinfectants, they will not prevent the article from softening in the course of time, destroying its merchantable value.

In order to overcome this difficulty, I subject the articles, pared and cut, or, in the case of pease, corn, &c., in their natural condition, to the action of a heated composition, in which sulphur is combined with other articles, the composition being heated in any suitable manner, and the vapors allowed to pass to the receptacles containing the fruit or other articles to be preserved, as heretofore, when sulphur and sugar have been used.

I have found that, while the sulphur preserves the articles, its efficiency is increased by the addition of ground coffee and brown sugar, using two ounces of sulphur and one-eighth of an ounce each of coffee, sugar, and alum to each gallon of the article to be preserved. The sugar and coffee act as disinfectants, and moderate the action of the sulphur without destroying its preservative qualities.

I claim—

A composition containing sulphur, alum, ground coffee, and brown sugar, in proportions substantially as described, which is heated for use in preserving fruits, &c., as set forth.

In testimony whereof I have signed my name to this specification in the presence of two subscribing witnesses.

RUDOLPHUS S. DASHIELL.

Witnesses:
R. G. SPRAGINS,
S. C. DODSON.